United States Patent
Koehn

(10) Patent No.: US 11,407,513 B2
(45) Date of Patent: Aug. 9, 2022

(54) AIRCRAFT SEAT ARRANGEMENT AND AIRCRAFT WITH AN AIRCRAFT SEAT ARRANGEMENT

(71) Applicant: Airbus Operations GmbH, Hamburg (DE)

(72) Inventor: Thorsten Koehn, Tornesch (DE)

(73) Assignee: Airbus Operations GmbH, Hamburg (DE)

( * ) Notice: Subject to any disclaimer, the term of this patent is extended or adjusted under 35 U.S.C. 154(b) by 632 days.

(21) Appl. No.: 16/455,059

(22) Filed: Jun. 27, 2019

(65) Prior Publication Data

US 2020/0002004 A1    Jan. 2, 2020

(30) Foreign Application Priority Data

Jun. 30, 2018    (DE) ...................... 10 2018 115 899.8

(51) Int. Cl.
*H04B 7/00*    (2006.01)
*B64D 11/06*    (2006.01)
(Continued)

(52) U.S. Cl.
CPC ....... *B64D 11/0624* (2014.12); *H04B 5/0062* (2013.01); *H04W 4/80* (2018.02); *B64D 2221/00* (2013.01)

(58) Field of Classification Search
CPC . B64D 11/0624; B64D 2221/00; H04W 4/80; H04B 5/0062
(Continued)

(56) References Cited

U.S. PATENT DOCUMENTS 6,929,218 B1 *  8/2005  Sanford ................ B64D 11/06
                                                    297/180.14
7,689,752 B1 *  3/2010  Redford .................. H04L 67/12
                                                    710/305
(Continued)

FOREIGN PATENT DOCUMENTS

CN    110654548 A    1/2020
CN    110654549 A    1/2020
(Continued)

OTHER PUBLICATIONS

Notice of Allowance for U.S. Appl. No. 16/455,086 dated Jul. 26, 2021.
(Continued)

*Primary Examiner* — April G Gonzales
(74) *Attorney, Agent, or Firm* — Jenkins, Wilson, Taylor & Hunt, P.A.

(57) ABSTRACT

An aircraft seat arrangement having identical groupings, each separately including at least one aircraft seat, each including a voltage supply port associated only with the aircraft seat for the connection of external devices of a passenger seated on the aircraft seat, a voltage supply unit, with a voltage input, at least one voltage output, each connected to the voltage supply port of another of the aircraft seat, and a switching circuit, such that each of the voltage output can be activated and deactivated. At least one control unit is connected to the switching circuit, and a near-field communication reading device is connected to the control unit for wireless reception of near-field communication signals from an external near-field communication sending device. The communication reading device can receive signals from a predetermined group of predetermined near-field communication signals. The number of predetermined signals in the group equals the number of aircraft seats in the grouping and each of the predetermined (Continued)

near-field communication signals is associated with another of the aircraft seats of the grouping. The control unit activates the voltage supply port by the switching circuit only upon receiving one of the predetermined signals, which port is associated with the aircraft seat associated with the received predetermined near-field communication signal.

12 Claims, 2 Drawing Sheets

(51) Int. Cl.
*H04B 5/00* (2006.01)
*H04W 4/80* (2018.01)

(58) Field of Classification Search
USPC ..................................... 455/41.2; 297/217.3
See application file for complete search history.

(56) References Cited

U.S. PATENT DOCUMENTS

| | | | |
|---|---|---|---|
| 8,826,830 B2* | 9/2014 | Pajic | H02J 7/02 108/50.01 |
| 10,149,340 B1* | 12/2018 | Rabii | H04W 76/15 |
| 11,180,255 B2 | 11/2021 | Bruchmann | |
| 11,279,092 B2* | 3/2022 | Koehn | B21D 26/033 |
| 2003/0054687 A1* | 3/2003 | Sanner | H01R 27/02 439/535 |
| 2003/0114178 A1* | 6/2003 | Chapelle | H04B 10/40 455/518 |
| 2004/0077308 A1* | 4/2004 | Sanford | B64D 11/0624 455/3.06 |
| 2005/0132407 A1* | 6/2005 | Boyer, Jr. | B64D 11/00155 348/E7.071 |
| 2006/0075934 A1* | 4/2006 | Ram | G06F 9/4416 108/44 |
| 2006/0175882 A1* | 8/2006 | Schweizer | B60N 3/004 297/146 |
| 2010/0224727 A1* | 9/2010 | Bauer | B64D 11/00151 244/118.5 |
| 2011/0075337 A1* | 3/2011 | Riley | A47C 7/72 361/679.21 |
| 2011/0174926 A1* | 7/2011 | Margis | G06F 1/18 725/77 |
| 2013/0020845 A1* | 1/2013 | Boomgarden | B64D 11/0624 297/217.3 |
| 2014/0044281 A1* | 2/2014 | Ganem | H04R 25/554 381/384 |
| 2014/0044293 A1* | 2/2014 | Ganem | B60L 53/64 381/74 |
| 2015/0126177 A1* | 5/2015 | Bauer | H04M 1/72454 455/420 |
| 2016/0170499 A1* | 6/2016 | Jiang | G06F 3/002 345/174 |
| 2016/0297527 A1* | 10/2016 | Everhart | B64D 11/00155 |
| 2017/0182957 A1* | 6/2017 | Watson | B60N 2/90 |
| 2018/0123679 A1* | 5/2018 | Hansen | H04W 4/42 |
| 2018/0217984 A1* | 8/2018 | Ohyama | B64D 11/00151 |
| 2018/0290753 A1* | 10/2018 | Gledich | B64D 11/0639 |
| 2019/0031366 A1* | 1/2019 | Lauer | H04B 5/0037 |
| 2019/0112050 A1* | 4/2019 | Ibrahim | G06K 9/62 |
| 2019/0126852 A1* | 5/2019 | Hupperich | B64D 11/0606 |
| 2020/0002005 A1* | 1/2020 | Brüchmann | B64D 11/0624 |
| 2020/0094985 A1* | 3/2020 | Quatmann | G09G 3/2003 |
| 2020/0204464 A1* | 6/2020 | Watson | G07C 5/008 |
| 2020/0290523 A1* | 9/2020 | Pajic | B64D 11/0638 |

FOREIGN PATENT DOCUMENTS

| | | |
|---|---|---|
| EP | 3 228 542 A1 | 10/2017 |
| WO | WO 2009/036375 A1 | 3/2009 |
| WO | WO 2014/075040 A1 | 5/2014 |
| WO | WO 2018/183820 A1 | 10/2018 |

OTHER PUBLICATIONS

Final Office Action for U.S. Appl. No. 16/455,086 dated May 14, 2021.

Non-Final Office Action for U.S. Appl. No. 16/455,086 dated Feb. 10, 2021.

* cited by examiner

AIRCRAFT SEAT ARRANGEMENT AND AIRCRAFT WITH AN AIRCRAFT SEAT ARRANGEMENT

CROSS-REFERENCE TO RELATED APPLICATION

This application claims priority to German Patent Application No. 10 2018 115 899.8 filed Jun. 30, 2018, the entire disclosure of which is incorporated by reference herein.

TECHNICAL FIELD

The disclosure herein relates to an aircraft seat arrangement having a plurality of identical groupings, wherein each of the identical groupings separately comprises at least one aircraft seat, each of which comprises a voltage supply port associated only with the particular aircraft seat for the connection of external devices of a passenger seated on the particular aircraft seat, and a voltage supply unit, containing a voltage input for connection to an onboard voltage network of an aircraft, and at least one voltage output, each of which is connected to the voltage supply port of another of the at least one aircraft seat. The disclosure herein further relates to an aircraft having such an aircraft seat arrangement.

BACKGROUND

Aircraft seats may have voltage supply ports, which allow the particular passenger to connect electrical devices and thus to be supplied with electricity on board the aircraft. These voltage supply ports are usually connected via a voltage supply unit to the onboard network of the aircraft. The voltage supply unit may herein convert the voltage of the onboard network to a suitable output voltage and, when a voltage supply unit is provided for a plurality of aircraft seats, distribute the voltage of the onboard network to the different voltage supply ports.

If the voltage supply ports of the different aircraft seats can be optionally activated and deactivated, it is possible to individually provide each passenger with an activated voltage supply port at their aircraft seat, for a fee. In this way, the airfare can be kept low if the passenger does not require a voltage supply port. Yet this service can be provided for those passengers who desire it.

For the optional activating and deactivating of functions, a central control system is usually provided, such as a central cabin management system in particular. It is then possible, for example, to configure the individual voltage supply ports or the individual voltage supply units such that they can be connected to the central control system and can be actuated by the latter in order to optionally activate the individual voltage supply ports. Especially in the case of airline companies offering low-price flights, however, the onboard equipment provided for passenger comfort may be reduced for cost reasons and there may be no connection of the voltage supply ports or the voltage supply units or the passenger seats to a central control system, or to a central control system at all. In such instances, however, it would already be advantageous to be able to provide passengers with an activated voltage supply port, for an added price.

The problem which the disclosure herein proposes to solve is to provide an aircraft seat arrangement of the kind mentioned at the outset, which is of simple and economical design, and can be operated in a simple and economical manner, and with which the voltage supply ports can be optionally activated, as well as an aircraft with such an aircraft seat arrangement.

This problem is solved by an aircraft seat arrangement and an aircraft as disclosed herein. Advantageous embodiments of the aircraft seat arrangement and the aircraft are disclosed herein.

SUMMARY

According to the disclosure herein, an aircraft seat arrangement is disclosed having a plurality of identical groupings. Each of the identical groupings herein separately comprises one or more aircraft seats, a voltage supply unit, one or more control units and a near-field communication reading device, i.e., these components are present separately for each grouping and are not shared by different groupings. In the event of a plurality of aircraft seats per grouping, these may be provided as an integrated unit or as separate aircraft seats which are mounted in an aircraft to form the grouping.

Each of the aircraft seats comprises a voltage supply port associated only with the particular aircraft seat for the connection of external devices of a passenger seated on the particular aircraft seat. Thus, the particular aircraft seat does not share the voltage supply port with other aircraft seats of the same grouping or a different grouping. The voltage supply port is preferably part of the particular aircraft seat and for example is integrated into it, such as for example in an arm rest of the aircraft seat.

The voltage supply unit, which may also be called an in-seat power supply unit, comprises a voltage input for connection to an onboard voltage network of an aircraft, in which the grouping is to be installed, and one or more voltage outputs—connected to the voltage input—each of which is connected to the voltage supply port of another of the aircraft seats of the grouping. Therefore, the number of voltage outputs is equal to the number of voltage supply ports. It should be considered herein that it is possible for the voltage supply unit to have even further voltage outputs, which are connected to further voltage supply ports of the aircraft seats. Each of the voltage outputs is adapted or configured to output a voltage which is derived from a voltage present at the voltage input. The voltage supply unit moreover comprises a switching circuit hooked up between the voltage input and the one voltage output or a plurality of voltage outputs, with which each of the voltage outputs can be optionally activated and deactivated, especially by optionally making or breaking the voltage supply port of the connection to the voltage input for each of the voltage outputs. Thus, with the aid of the switching circuit, it is possible for each of the voltage outputs to switch between a deactivated state, in which no voltage derived from the voltage input is present at the particular voltage output, and an activated state, in which this is the case.

The one control unit is or the plurality of control units are connected to the switching circuit. Preferably, only one control unit is present for each grouping, which control unit is then responsible for all aircraft seats of the grouping. However, it is also possible, for example, to provide separate control units for the different aircraft seats of the grouping. Each such control unit may have its own power supply or preferably be connected to the voltage supply unit for its power supply.

The near-field communication reading device is adapted or configured for the wireless reception of near-field communication signals from an external active or passive near-field communication sending device and is connected to the control unit or the control units. Near-field communication in the sense of the disclosure herein means any kind of noncontact communication between two communication devices, which is only possible when the two communication devices are arranged in relative spatial proximity to each other. Only during this temporary spatial proximity to each other can they exchange information and/or data by a predefined communication protocol. For example, the spatial distance of the communication devices from each other within which a data exchange is possible may be a few centimeters, such as less than 15 cm, less than 10 cm or less than 5 cm.

The near-field communication reading device is adapted or configured to receive near-field communication signals from a predetermined group or number of predetermined near-field communication signals. The number of predetermined near-field communication signals of the group is equal to the number of aircraft seats in the grouping. It is therefore possible for the group or number to contain only one predetermined near-field communication signal or else two or more predetermined near-field communication signals. Each of the predetermined near-field communication signals is associated with another of the aircraft seats of the grouping, and the near-field communication reading device and the control unit or the control units are moreover adapted or configured such that the control unit or control units activates or activate the voltage supply port by the switching circuit only in response to receiving one of the predetermined near-field communication signals from an external near-field communication sending device, which sends out the respective predetermined near-field communication signal, by the near-field communication reading device, which part is associated with the aircraft seat associated with the received predetermined near-field communication signal. For this, the control units may for example directly process a signal corresponding to the received near-field communication signal and relayed by the near-field communication reading device and generate a corresponding control signal for actuating the switching circuit, or the near-field communication reading device may generate a first control signal for actuating the control units, in dependence on the received near-field communication signal, which in turn generate on the basis of this actuation a second control signal for actuating the switching circuit. If only one control unit is provided in the grouping, this responds in the described manner to each of the predetermined near-field communication signals. On the other hand, if a plurality of control units is provided in the grouping, it is possible for each of the control units to respond only to receiving another one of the predetermined near-field communication signals and to perform the corresponding control function.

In each instance, the group of predetermined near-field communication signals is the same for all groupings due to the identical configuration of the groupings. Therefore, all groupings are controlled in identical manner with the same predetermined near-field communication signals. In this way, it is particularly easily possible for the flight personnel to selectively activate the power supply port at the particular aircraft seat for individual passengers who desire this. It is only necessary to send the corresponding one of the predetermined near-field communication signals to the near-field communication reading device when the particular member of the flight personnel is in immediate proximity to the near-field communication reading device. For example, flight attendants may carry along with them a limited number of external near-field communication sending devices, such as for example NFC or RFID devices, each of which is adapted or configured to send out a different one of the predetermined near-field communication signals from the predetermined group. It is then only necessary to hold the near-field communication sending device corresponding to the aircraft seat at the near-field communication reading device of the particular grouping. Alternatively, the flight attendants may, for example, carry along a device which is adapted or configured to send out optionally each of the predetermined near-field communication signals from the predetermined group, such as for example a mobile telephone outfitted with an NFC chip or a similar device.

The aircraft seat arrangement is thus very easy to operate. At the same time, it has a simple and economical construction, since it is not necessary to connect the individual groupings or the individual voltage supply units or aircraft seats to a central control system or even to provide such a system. Furthermore, it is easily possible to retrofit aircraft with the optional activation and deactivation of existing voltage supply ports. It is only necessary to provide the near-field communication reading device and to either replace the voltage supply units of the different groupings or, if the voltage supply units already have a controllable switching circuit, to provide the groupings with the control units.

In one preferred embodiment, the voltage supply unit is provided on the one side and the control unit or the control units is or are provided on the other side in separate housings. If there are a plurality of control units, these may in turn be arranged in separate housings or in a common housing. For example, it is herein possible to integrate the control unit or the control units into a housing section of a data port for connection to the voltage supply unit. In any case, the voltage supply unit in this embodiment comprises a control input port connected to the switching circuit and the control unit comprises a control output port connected to the control input port. The control unit is adapted or configured to output a control signal in dependence on the received predetermined near-field communication signal to the control output port in order to activate the voltage supply port only upon receiving one of the predetermined near-field communication signals by the switching circuit, which port is associated with the aircraft seat associated with the received predetermined near-field communication signal. This configuration has the advantage that—if the existing voltage supply units in an aircraft already have a control input port and a switching circuit—the existing aircraft seat groupings can be retrofitted in a very easy manner. It is only necessary to provide one or more control units, for example in the form of an adapter box, and a near-field communication reading device, and to connect them to the voltage supply unit.

In an alternative preferred embodiment, the control unit is or the control units are part of the voltage supply unit. In particular, they may then be integrated in a housing of the voltage supply unit. This configuration has the advantage that existing aircraft seat groupings can be easily retrofitted—regardless of whether the existing voltage supply units of an aircraft have a control input port and a switching circuit. It is only necessary to replace the existing voltage supply units in each case with a new voltage supply unit and to additionally provide a near-field communication reading device.

In one preferred embodiment, the voltage supply port of each of the aircraft seats of the grouping comprises one or more separate connection devices. For example, a plurality of connection devices may be provided, which provide different voltages, such as for example 110 V alternating voltage or 5 V d.c. voltage, and/or different kinds of plugs. It is preferable herein for the connection device or the connection devices of each voltage supply port to be chosen from the group containing a receptacle—possibly also different receptacle types from different countries —, a USB port and a wireless power transmission device.

In one preferred embodiment, the near-field communication reading device is an NFC or RFID reading device. It is then adapted or configured to interact with external NFC or RFID sending devices and to receive NFC or RFID signals as near-field communication signals. The external NFC or RFID sending devices may in this case be for example NFC or RFID tags or chips or mobile devices outfitted with an NFC or RFID function, such as for example mobile telephones.

In one preferred embodiment, each of the groupings comprises a plurality of the aircraft seats. For example, each grouping may comprise three seats corresponding to an aisle seat, a centre seat and a window seat. The flight attendants may then carry along with them three different near-field communication sending devices for the three different seats, for example. Alternatively, however, it is also possible for each of the groupings to have only a single aircraft seat.

In one preferred embodiment, the voltage supply unit comprises a voltage transformer and/or a distributor.

In one preferred embodiment, each of the groupings has a status display, such as for example a status lamp, which is connected to the voltage supply unit and adapted or configured to indicate, under control by the voltage supply unit, whether the voltage supply port of at least one of the aircraft seats of the grouping is activated and in use. The status display may be provided, for example, on one side of an aircraft seat of the grouping, so that after installation in an aircraft the side is arranged on an aisle of the aircraft, so that it can be easily recognized by a flight attendant. In any case, an antenna of the near-field communication reading unit is integrated in the status display or arranged adjacent to it. Since the status display is often provided anyway, or even must be provided, and since it must be easily visible to the flight personnel, the antenna is therefore likewise easily accessible to the flight personnel.

According to the disclosure herein moreover there is provided an aircraft having a seat arrangement according to one of the above-described embodiments. It is herein possible for the aircraft to have a plurality of different seat arrangements according to one of the above-described embodiments, and thus also to have a plurality of different groupings.

In a preferred embodiment of the aircraft, the voltage supply unit and the control unit of each of the groupings are separate from any central control systems, such as for example a central onboard management system, for the central control of functions in the cabin. For example, if the aircraft has a central onboard management system, the voltage supply unit and the control unit or control units of each of the groupings are separated from the onboard management system. Alternatively, the aircraft has no central control system at all and in particular no onboard management system.

BRIEF DESCRIPTION OF THE DRAWINGS

In the following, an example embodiment of the disclosure herein is explained more closely with reference to the drawings.

DETAILED DESCRIPTION

Figure 1:
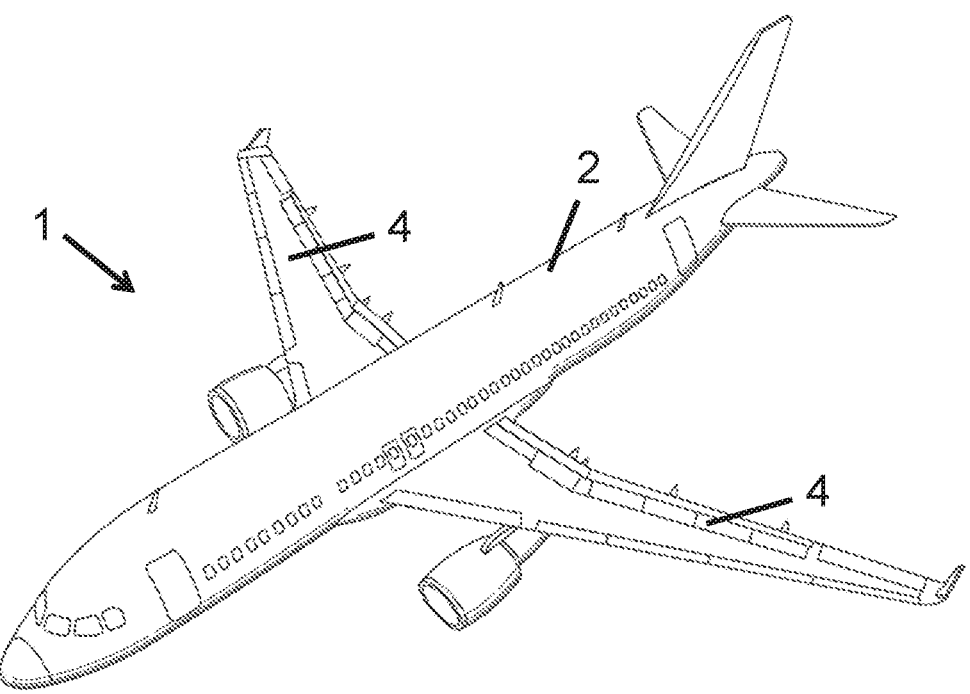
FIG. 1 shows a schematic view of an aircraft.
Figure 2:
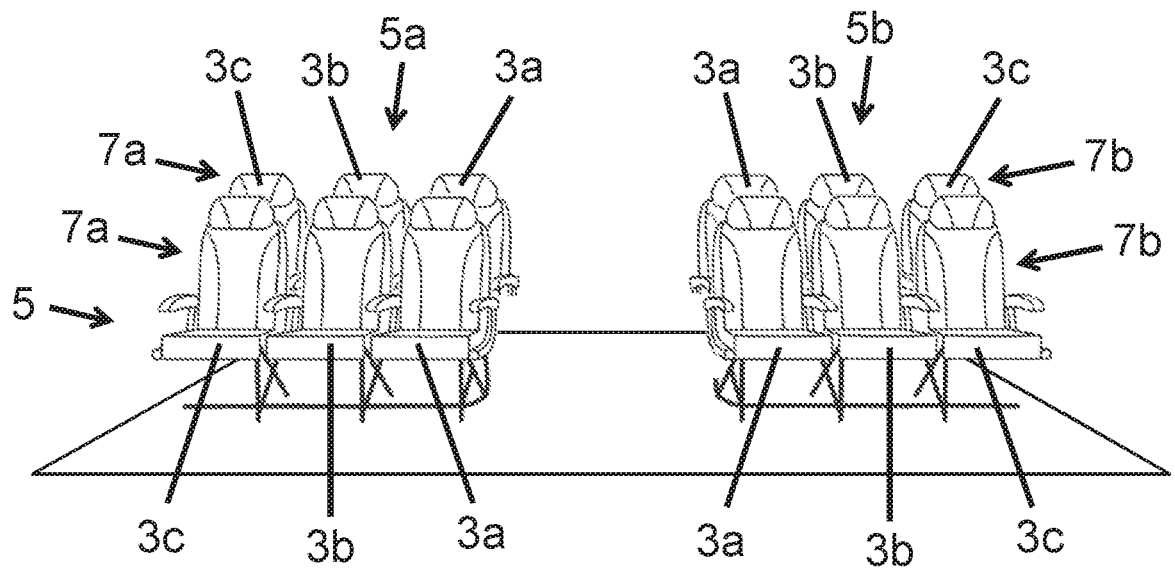
FIG. 2 shows a schematic perspective view of a plurality of aircraft seat arrangements according to one embodiment of the disclosure herein.

The aircraft 1 shown in FIG. 1 has a fuselage 2 and two wings 4. Inside the fuselage 2 there are arranged a plurality of aircraft seats 3a, 3b, 3c in an overall arrangement 5, comprising two different aircraft seat arrangements 5a and 5b (see FIG. 2). The aircraft seat arrangements 5a and 5b are arranged here at the two opposite window sides. Each of the aircraft seat arrangements 5a, 5b has in each case a plurality of identical groupings 7a or 7b positioned one after another along the longitudinal axis of the aircraft 1.

Figure 3:
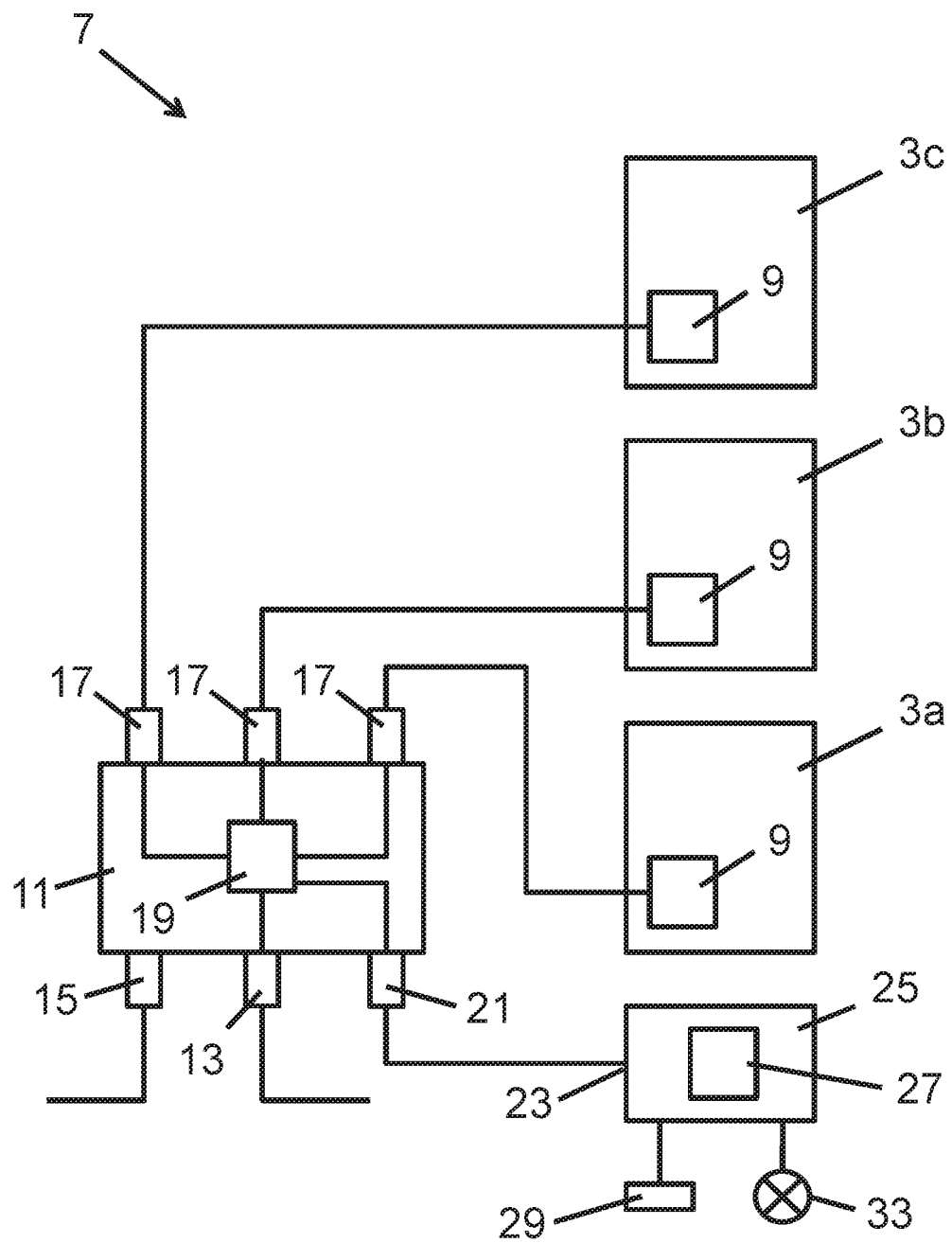
FIG. 3 shows a schematic block diagram of a grouping of an aircraft seat arrangement according to one embodiment of the disclosure herein.

One of these groupings 7a or 7b is represented in FIG. 3 in the form of a block diagram and is denoted there by the reference number 7, wherein the grouping 7 comprises for example three aircraft seats 3a, 3b, 3c, the aircraft seat 3a being an aisle seat, the aircraft seat 3b being a centre seat, and the aircraft seat 3c being a window seat. Each of the aircraft seats 3a, 3b and 3c has its own separate voltage supply port 9, which is integrated for example in an arm rest of the particular aircraft seat 3a, 3b or 3c. Each of the voltage supply ports 9 is connected in parallel to a voltage supply unit 11 of the grouping 7, which in turn is connected via a voltage input 13 to an onboard network of the aircraft 1. A plurality of groupings 7 may herein be hooked up in series, so that the grouping 7 has a further port 15 by which it is connected to a further grouping of the same aircraft seat arrangement 5a or 5b. The voltage supply unit 11 comprises, for each of the aircraft seats 3a, 3b and 3c or each of the voltage supply ports 9, a separate voltage output 17 as well as a switching circuit 19, which is hooked up between the one voltage input 13 and the voltage outputs 17 and with which each of the voltage outputs 17 can be optionally switched between an activated and a deactivated state. In other words, by the switching circuit 19 it is possible to optionally make or break the connection between the voltage input 13 and each of the voltage outputs 17. The voltage supply unit 11 provides a voltage distributor and a voltage transformer in this case.

The voltage supply unit 11 furthermore comprises a control signal input port 21, to which a control signal output port 23 of a control unit 25 is connected, being provided in the form of an external adapter box. The control unit 25 comprises an NFC reading device 27, which is connected to an NFC antenna 29 and in combination with this is adapted or configured for receiving three predetermined NFC signals, each of which is or can be sent out during the operation by another one of three NFC cards 31a, 31b and 31c. The control unit 25 is adapted or configured such that it outputs a corresponding control signal at its control signal output port 23 only upon receiving one of the three predetermined NFC signals, i.e., only when one of the three NFC cards 31a, 31b or 31c is temporarily brought into the immediate proximity of the NFC antenna 29. The respective control signal is herein characteristic of the respective NFC card 31a, 31b or 31c, and the switching circuit 19 is adapted or configured to activate an associated voltage output 17 upon receiving one of the three possible control signals. These are deactivated in a standard manner at the start, i.e., at the beginning of a flight. The NFC card 31a here is associated with the voltage output 17 connected to the aircraft seat 3a, the NFC card 31b is associated with the voltage output 17 connected to the aircraft seat 3b and the NFC card 31c is associated with the voltage output 17 connected to the aircraft seat 3c.

In order to free up the voltage supply port 9 for a passenger on a particular aircraft seat 3a, 3b or 3c as required, it is therefore only necessary for a flight attendant to select the proper NFC card 31a, 31b or 31c and hold it at the NFC antenna 29. In order for the antenna 29 to be easily accessible, it may be integrated into a status display 33, which is provided on the aisle side of the grouping 7.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft seat arrangement having a plurality of identical groupings, wherein each of the identical groupings separately comprises:
at least one aircraft seat, each of which comprises a voltage supply port associated only with a particular aircraft seat for the connection of external devices of a passenger seated on the particular aircraft seat;
a voltage supply unit, comprising a voltage input for connection to an onboard voltage network of an aircraft, at least one voltage output, each of which is connected to the voltage supply port of another of the at least one aircraft seat, and a switching circuit hooked up between the voltage input and the at least one voltage output, with which each of the at least one voltage output can be optionally activated and deactivated;
at least one control unit connected to the switching circuit; and
a near-field communication reading device connected to the at least one control unit for wireless reception of near-field communication signals from an external near-field communication sending device,
wherein the near-field communication reading device is configured to receive near-field communication signals from a predetermined group of predetermined near-field communication signals, wherein a number of predetermined near-field communication signals in the group is equal to a number of aircraft seats in the grouping and each of the predetermined near-field communication signals is associated with another of the aircraft seats of the grouping, and wherein the near-field communication reading device and the at least one control unit are configured such that the at least one control unit activates the voltage supply port by the switching circuit only upon receiving one of the predetermined near-field communication signals, which port is associated with the aircraft seat associated with the received predetermined near-field communication signal.

2. The aircraft seat arrangement according to claim 1, wherein the voltage supply unit and the at least one control unit are in separate housings, wherein the voltage supply unit comprises a control input port connected to the switching circuit and the at least one control unit comprises a control output port connected to the control input port, and wherein the at least one control unit is configured to output a control signal at the control output port in dependence on the received predetermined near-field communication signal in order to activate the voltage supply port by the switching circuit only upon receiving one of the predetermined near-field communication signals, which port is associated with the aircraft seat associated with the received predetermined near-field communication signal.

3. The aircraft seat arrangement according to claim 1, wherein the at least one control unit is part of the voltage supply unit.

4. The aircraft seat arrangement according to claim 1, wherein the voltage supply port of each of the at least one aircraft seat comprises one or more separate connection device or devices.

5. The aircraft seat arrangement according to claim 4, wherein the connection device or the connection devices of each voltage supply port are selected from the group consisting of a receptacle, a USB port and a wireless power transmission device.

6. The aircraft seat arrangement according to claim 1, wherein the near-field communication reading device is an NFC or RFID reading device.

7. The aircraft seat arrangement according to claim 1, wherein each of the groupings comprises a plurality of the aircraft seats.

8. The aircraft seat arrangement according to claim 1, wherein the voltage supply unit comprises a voltage transformer and/or a distributor.

9. The aircraft seat arrangement according to claim 1, wherein each of the groupings has a status display, which is connected to the voltage supply unit and configured to indicate, under control by the voltage supply unit, whether the voltage supply port of at least one of the aircraft seats of the grouping is activated and in use, wherein an antenna of the near-field communication reading unit is integrated in the status display or arranged adjacent to it.

10. An aircraft having an aircraft seat arrangement according to claim 1.

11. The aircraft according to claim 10, wherein the aircraft has a plurality of different seat arrangements.

12. The aircraft according to claim 10, wherein the voltage supply unit and the at least one control unit of each of the groupings is separate from any central control systems for central control of functions in a cabin of the aircraft.

\* \* \* \* \*